US012241405B2

(12) United States Patent
Ishikawa

(10) Patent No.: US 12,241,405 B2
(45) Date of Patent: Mar. 4, 2025

(54) INTERNAL COMBUSTION ENGINE AND CYLINDER BLOCK

(71) Applicant: ISUZU MOTORS LIMITED, Yokohama (JP)

(72) Inventor: Yasuhiro Ishikawa, Fujisawa (JP)

(73) Assignee: ISUZU MOTORS LIMITED, Yokohama (JP)

( * ) Notice: Subject to any disclaimer, the term of this patent is extended or adjusted under 35 U.S.C. 154(b) by 0 days.

(21) Appl. No.: 18/609,612

(22) Filed: Mar. 19, 2024

(65) Prior Publication Data

US 2024/0328344 A1 Oct. 3, 2024

(30) Foreign Application Priority Data

Mar. 28, 2023 (JP) ................................ 2023-052308

(51) Int. Cl.
*F02F 1/00* (2006.01)
*F02B 59/00* (2006.01)
*F02F 1/20* (2006.01)

(52) U.S. Cl.
CPC ................ *F02B 59/00* (2013.01); *F02F 1/20* (2013.01)

(58) Field of Classification Search
CPC ........ F16J 1/04; F16J 10/04; F16J 1/02; F02F 1/004; F02F 3/022; F02F 1/183
USPC ........................................................ 123/193.2
See application file for complete search history.

(56) References Cited

U.S. PATENT DOCUMENTS 10,760,524 B2 * 9/2020 Takeda .................... F02F 3/022
11,680,538 B2 * 6/2023 Gaiselmann ............ F02F 1/004 123/193.2
2019/0338723 A1 * 11/2019 Takeda .................... F02F 1/183

FOREIGN PATENT DOCUMENTS

JP H078544 U 2/1995
JP 2010255847 A 11/2010
JP 2011080436 A 4/2011
JP 2020125698 A * 8/2020
JP 2020148158 A * 9/2020

* cited by examiner

*Primary Examiner* — Long T Tran
*Assistant Examiner* — James J Kim
(74) *Attorney, Agent, or Firm* — The Roy Gross Law Firm, LLC; Roy Gross

(57) ABSTRACT

An internal combustion engine to reduce abrasion with a piston while retaining oil film on an upper portion of a cylinder includes: a cylinder block that includes a cylinder, and a piston that is stored in the cylinder in a manner capable of reciprocating along an axis line of the cylinder, in which the cylinder includes a multi-bulging inner circumference portion in which a diameter in a thrust-anti thrust direction is a minimal diameter.

4 Claims, 7 Drawing Sheets

INTERNAL COMBUSTION ENGINE AND CYLINDER BLOCK

CROSS REFERENCE TO RELATED APPLICATIONS

This application is entitled to (or claims) the benefit of Japanese Patent Application No. 2023-052308, filed on Mar. 28, 2023, the disclosure of which including the specification, drawings and abstract is incorporated herein by reference in its entirety.

TECHNICAL FIELD

The present disclosure relates to an internal combustion engine and a cylinder block.

BACKGROUND ART

Conventionally, in an internal combustion engine such as an engine, in order to reduce abrasion loss of a piston that slides in a cylinder block, a method of reducing an outer circumferential area of a skirt portion contacting a cylinder-block inner circumferential surface is known, for example.

For example, in Patent Literature (hereinafter referred to as "PTL") 1, a skirt portion of a piston in a circumferential direction is formed in an oval shape longer in length in a thrust-anti thrust direction perpendicular to an axis of a piston pin than in a direction of the axis of the piston pin, thereby reducing a sliding area in between with an inner circumferential surface of a cylinder. Further, as a configuration in which a shape on a cylinder side is changed, for example, PTL 2 discloses a structure in which a cylinder includes an inner circumferential surface with a long thrust-anti thrust direction and, into this inner circumferential surface, a cylinder liner having a circular or oval inside is fitted.

CITATION LIST

Patent Literature

PTL 1

Japanese Patent Application Laid-Open No. 1995-008544

PTL 2

Japanese Patent Application Laid-Open No. 2011-80436

SUMMARY OF INVENTION

Technical Problem

Incidentally, in the conventional configuration of PTL 1 mentioned above, in order to reduce a sliding area between the piston and the cylinder, it is conceivable to increase an oval amount (which is obtained by subtracting minor axis diameter from major axis diameter) in the skirt portion of the piston, i.e., to increase the length in the thrust-anti thrust direction.

However, an excessive oval amount decreases a contacting region between the piston and the cylinder at this part, but increases a surface pressure when the skirt portion is brought into contact at an upper portion of the cylinder with high combustion pressure. Consequently, a problem lies in that abrasion deterioration or seizure may occur due to oil film breakage at the upper portion of the cylinder. Hence, there is a need for a structure that more effectively reduces abrasion caused by sliding of the piston in the cylinder.

An object of the present invention is to provide an internal combustion engine and a cylinder block each capable of reducing abrasion with a piston while retaining oil film on an upper portion of a cylinder.

Solution to Problem

In order to achieve the above object, an aspect of an internal combustion engine according to the present invention adopts a configuration that includes: a cylinder block that includes a cylinder; and a piston that is stored in the cylinder in a manner capable of reciprocating along an axis line of the cylinder, in which the cylinder includes a multi-bulging inner circumference portion in which a diameter in a thrust-anti thrust direction is a minimal diameter.

An aspect of a cylinder block according to the present invention adopts a configuration in which a cylinder that stores therein a piston such that the piston is capable of reciprocating therein includes a multi-bulging inner circumference portion in which a diameter in a thrust-anti thrust direction is a minimal diameter.

Advantageous Effects of Invention

According to the present invention, it is possible to reduce abrasion with a piston while retaining oil film on an upper portion of a cylinder.

DESCRIPTION OF EMBODIMENTS

Hereinafter, an embodiment of the present disclosure will be described with reference to the drawings. Engine 1 illustrated in FIG. 1 includes engine body 10 and transmission portion T/M connected to engine body 10. Engine 1 outputs a driving force via drive shaft 2 and rotationally drives wheels 3.

Figure 1:
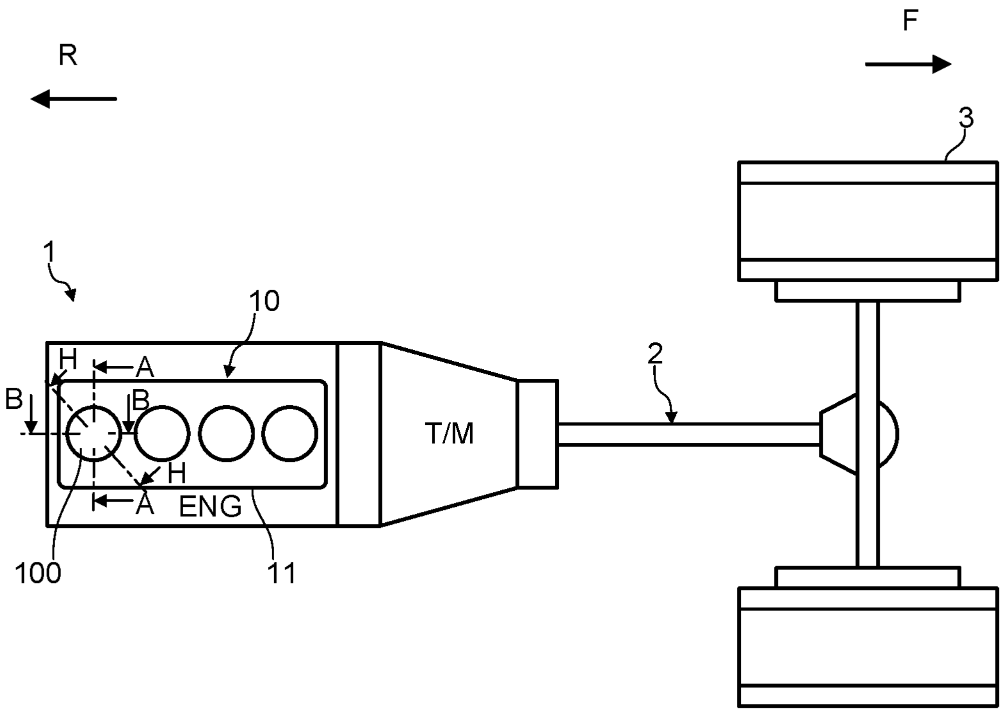
FIG. 1 schematically illustrates a vehicle including an internal combustion engine according to an embodiment of the present invention.
Figure 2:
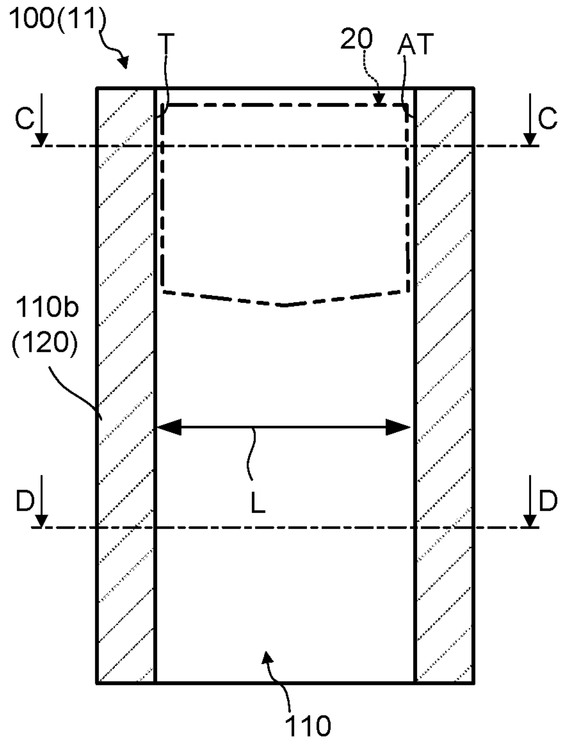
FIG. 2 is a schematic longitudinal cross-sectional view taken along an A-A line of FIG. 1.
Figure 3:
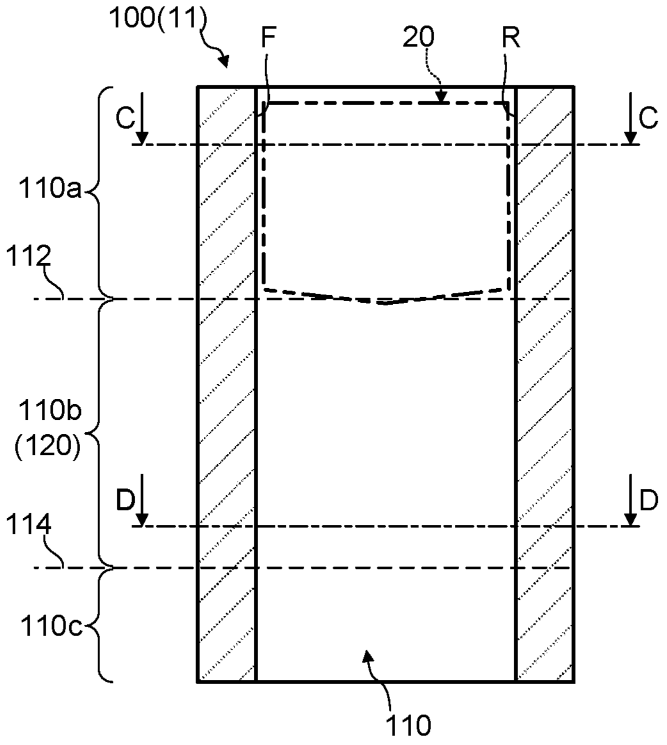
FIG. 3 is a schematic longitudinal cross-sectional view taken along a B-B line of FIG. 1.
Figure 4:
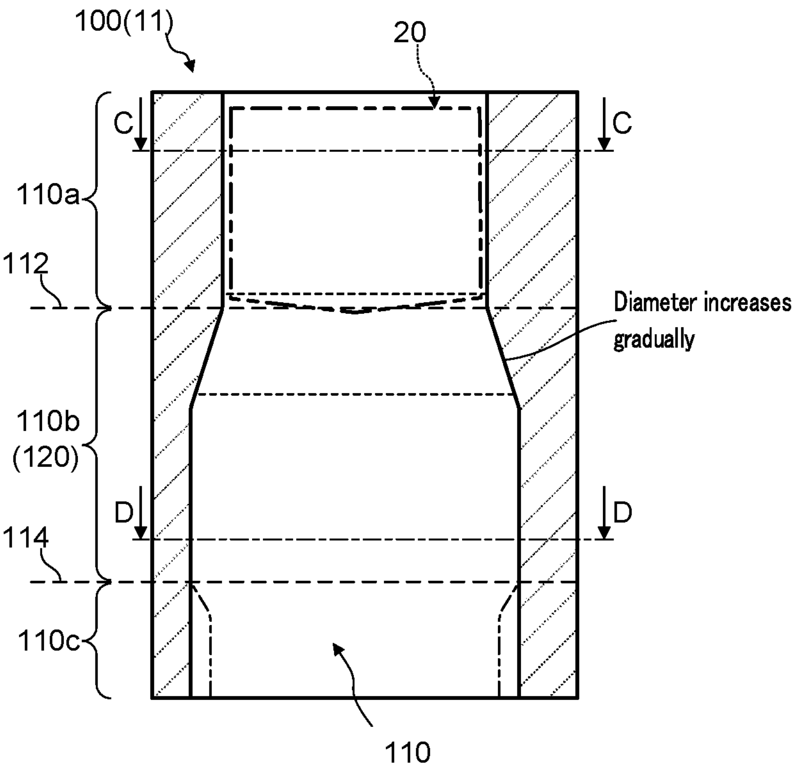
FIG. 4 is a schematic longitudinal cross-sectional view taken along an H-H line of FIG. 1.

FIG. 2 is a schematic longitudinal cross-sectional view taken along an A-A line of FIG. 1, FIG. 3 is a schematic longitudinal cross-sectional view taken along a B-B line of FIG. 1, and FIG. 4 is a schematic longitudinal cross-sectional view taken along an H-H line of FIG. 1. In FIGS. 2 to 4, a configuration of an inner circumference portion of cylinder 100 in cylinder block 11 of engine body 10 illustrated in FIG. 1 is illustrated while illustration of a cylinder heads is omitted. Further, FIGS. 2 to 4 each illustrate piston 20 positioned in a top dead center in the inner circumference portion of cylinder 100.

Figure 5A:
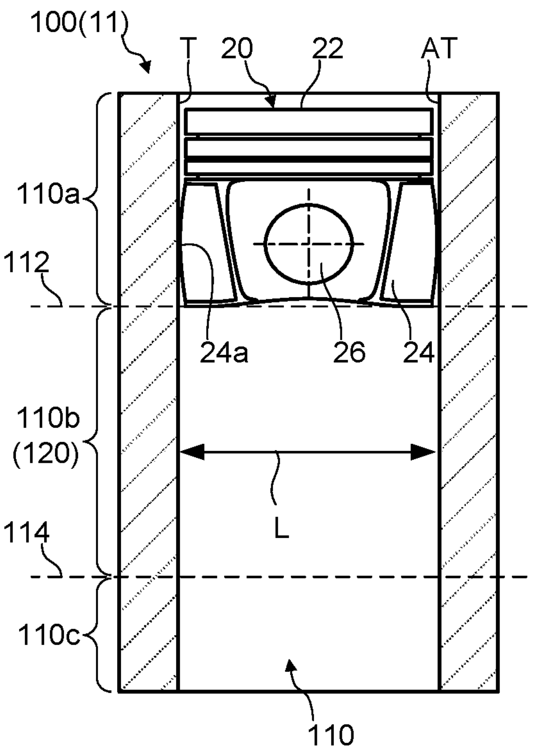
FIGS. 5A to 5D are each a cross-sectional view on a piston operation that generates a lateral pressure in a cylinder illustrated in FIG. 2.
Figure 5B:
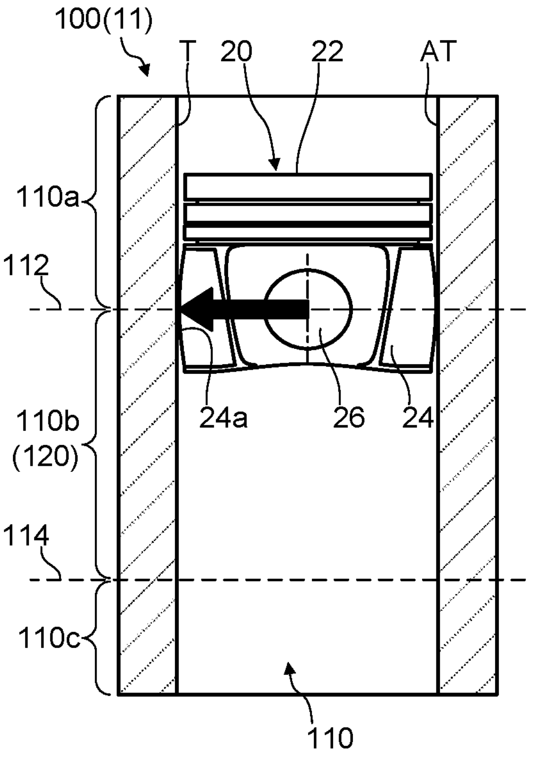
Figure 5C:
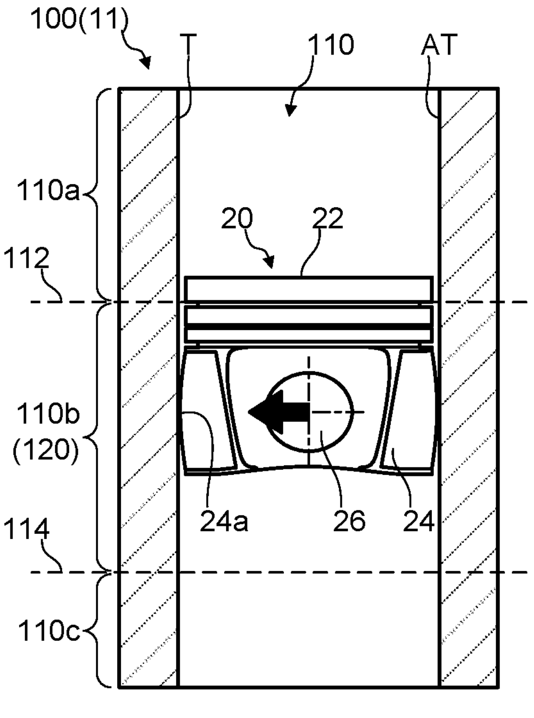
Figure 5D:
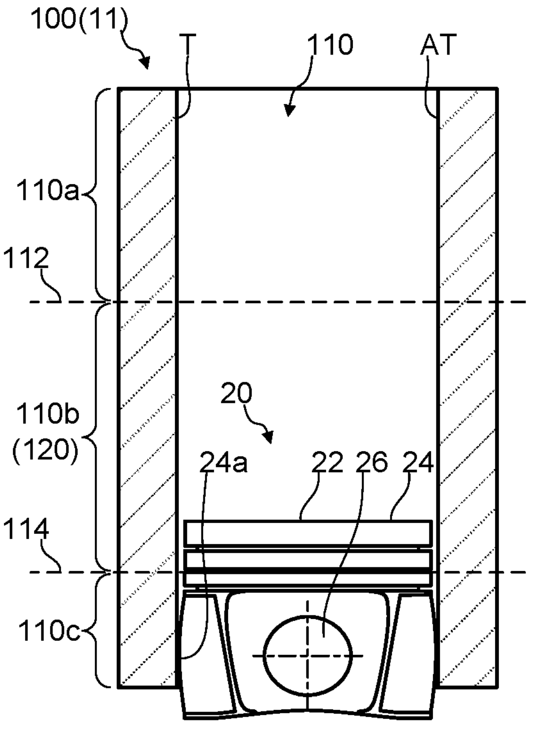

FIGS. 5A to 5D are each a cross-sectional view on a piston operation that generates a lateral pressure (side pressure) in the cylinder illustrated in FIG. 2. FIG. 5A illustrates a state in which a piston is in a top dead center, FIG. 5B illustrates a state in which the lateral pressure is maximal. Further, FIG. 5C illustrates the piston moving through a central portion and a state in which a large abrasion thereby occurs, and FIG. 5D illustrates a state in which the piston is in a bottom dead center. Note that the lateral pressure is a piston side pressure, which is also referred to as a side thrust. In addition, a thrust side is referred to as thrust (T), and an anti-thrust side is referred to as anti-thrust (AT).

Engine body 10 includes, in addition to cylinder block 11 on which the cylinder head (not illustrated) is mounted at an upper portion, a crank chamber (not illustrated) for storing therein a crank shaft (not illustrated) coupled to piston 20 via a connecting rod (con-rod, not illustrated). Engine body 10 also includes intake and exhaust systems (not illustrated), and the intake and exhaust systems (in particular, intake pipe and exhaust pipe) are connected to the cylinder head and the like. Cylinder block 11 includes cylinder 100 that stores therein piston 20 in a manner capable of reciprocating (see FIGS. 5A to 5D).

Incidentally, piston 20 is connected to the crank shaft (not illustrated) via the con-rod (not illustrated). Piston 20 is turnably attached to the con-rod with piston pin 26 (see FIG. 5) and includes, as is well known, crown portion 22 that defines a combustion chamber, together with an upper portion of cylinder 100, and skirt portion 24 that is connected to a lower side of crown portion 22.

Crown portion 22 includes recessed portion 21 on a top surface thereof and includes an outer circumferential surface formed in a perfect circle in cross section. An outer circumferential surface of skirt portion 24 is formed in an oval shape in which a diameter in the thrust (T)-anti thrust (AT) direction is longer than a diameter in an extending direction of piston pin 26 (axis direction of piston pin 26 and axis direction of con-rod). The outer circumferential surface of skirt portion 24 may be formed in a perfect circular shape.

Figure 6:
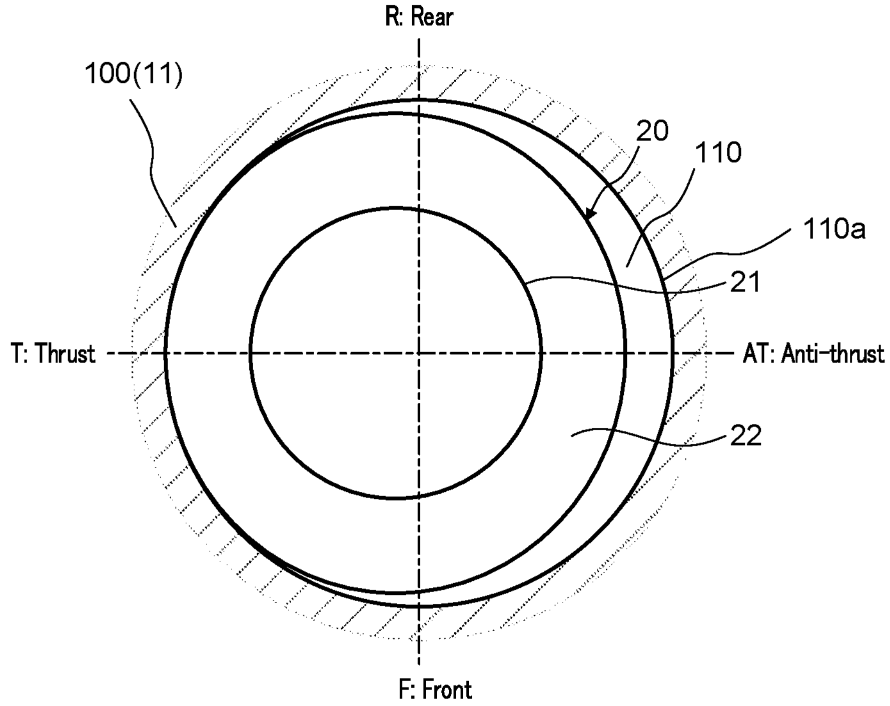
FIG. 6 is a plane cross-sectional view on a relation with a piston at C-C line parts of FIG. 2, FIG. 3, and FIG. 4.
Figure 7:
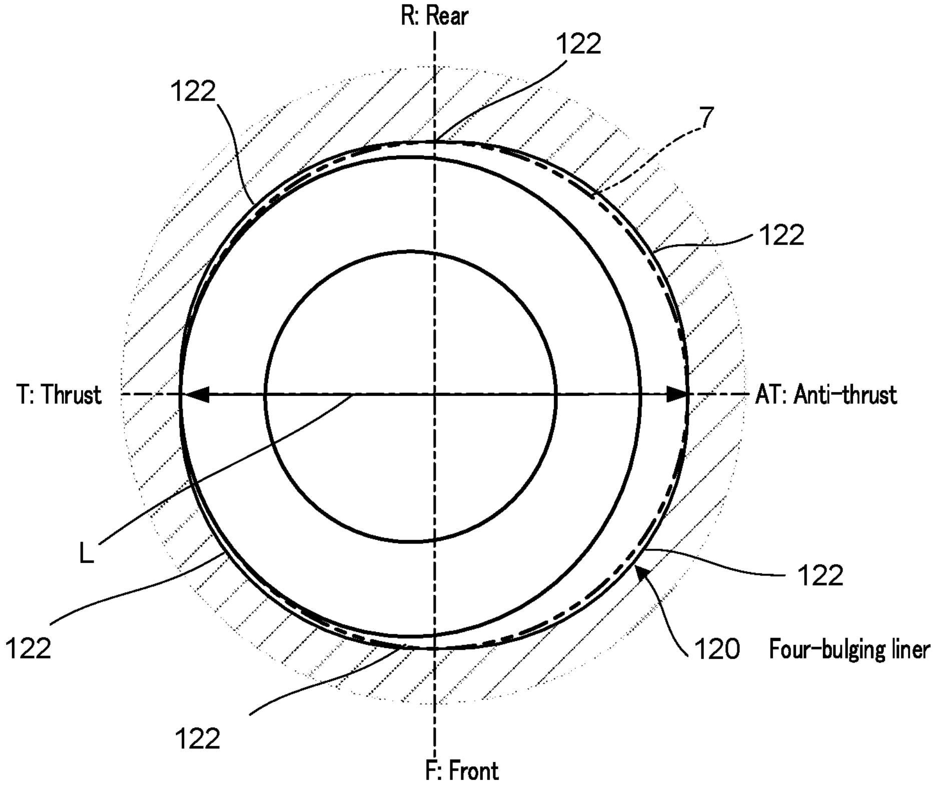
FIG. 7 is a plane cross-sectional view on a relation with a piston at D-D line parts of FIG. 2, FIG. 3, and FIG. 4.

FIG. 6 illustrates a position relation between a perfect circular portion of the cylinder indicated in a cross-sectional view taken along a C-C line and a piston in a side thrust position, and FIG. 7 illustrates a position relation between a central portion of the cylinder indicated in a cross-sectional view taken along a D-D line and the piston in the side thrust position. Gaps between the cylinder inner circumference portions and pistons 20 illustrated in FIGS. 6 and 7 are exaggerated from the actual gaps for easy viewing.

Cylinder 100 is a hollowed cylindrical-body formed in cylinder block 11, inside of which piston 20 slides along an axis of the cylinder. In cylinder 100, an inner circumferential surface of upper portion 110*a* is made a perfect circular shape (substantially perfect circular shape close to perfect circle), and this part is referred to as a perfect-circular inner circumference portion. Further, in cylinder 100, an inner circumferential surface of central portion 110*b* is made a multi-bulging (multi-dimensional) inner circumferential surface in which a diameter in the thrust (T)-anti thrust (AT) direction is minimal diameter L, and central portion 110*b*, which is a portion including this inner circumferential surface, is regarded as multi-bulging inner circumference portion 120. Incidentally, cylinder 100 includes the perfect-circular inner circumference portion on a side of the top dead center of piston 20 relative to multi-bulging inner circumference portion 120. Upper portion 110*a* is contiguous to a cylinder head that closes an upper side, and a top surface of the piston head of piston 20 forms a lower surface of the combustion chamber.

Central portion 110*b*, i.e., multi-bulging inner circumference portion 120 is configured to have a less contact area with piston 20, specifically, skirt portion 24 and to reduce sliding abrasion, as compared to a case where the inner circumferential surface of central portion 110*b* is perfectly circular.

Multi-bulging inner circumference portion 120 is formed below a lower edge of skirt portion 24 when piston 20 is in the uppermost position (position at which piston head is positioned to top dead center), for example.

Further, preferably, multi-bulging inner circumference portion 120 is formed below position (position receiving maximal lateral pressure) 112 in the inner circumferential surface of the cylinder to which the maximal lateral pressure (maximal side thrust) is applied in cylinder 100.

A length of central portion 110*b* in the axis direction (piston-moving direction) is longer than in upper portion 110*a*, and is a region where sliding abrasion with piston 20 (skirt portion 24) is larger than that in the upper portion. Central portion 110*b* (multi-bulging inner circumference portion 120) is formed below a position at which a combustion pressure acts in combustion and expansion strokes to tilt the con-rod, thereby generating a component force (side thrust force) of the piston pushing the cylinder, and a position with which thrust-side edge portion 24*a* of skirt portion 24 is in contact.

Multi-bulging inner circumference portion 120 is an inner circumferential surface having a multi-bulging shape. The term "multi-bulging shape" refers to a shape bulging outward in multiple directions at multiple positions relative to an outer diameter of a virtual cylinder through which piston 20 passes. Multi-bulging inner circumference portion 120 is configured to have, while slidably storing piston 20 inside, a diameter in the thrust-anti thrust direction in inner circumferential surface 110 of cylinder 100, which is constant at the length of minimal diameter L of a circumference of multi-bulging inner circumference portion 120 (circumference in cross-sectional shape), downward from a lower edge of upper portion 110*a*.

Figure 8:
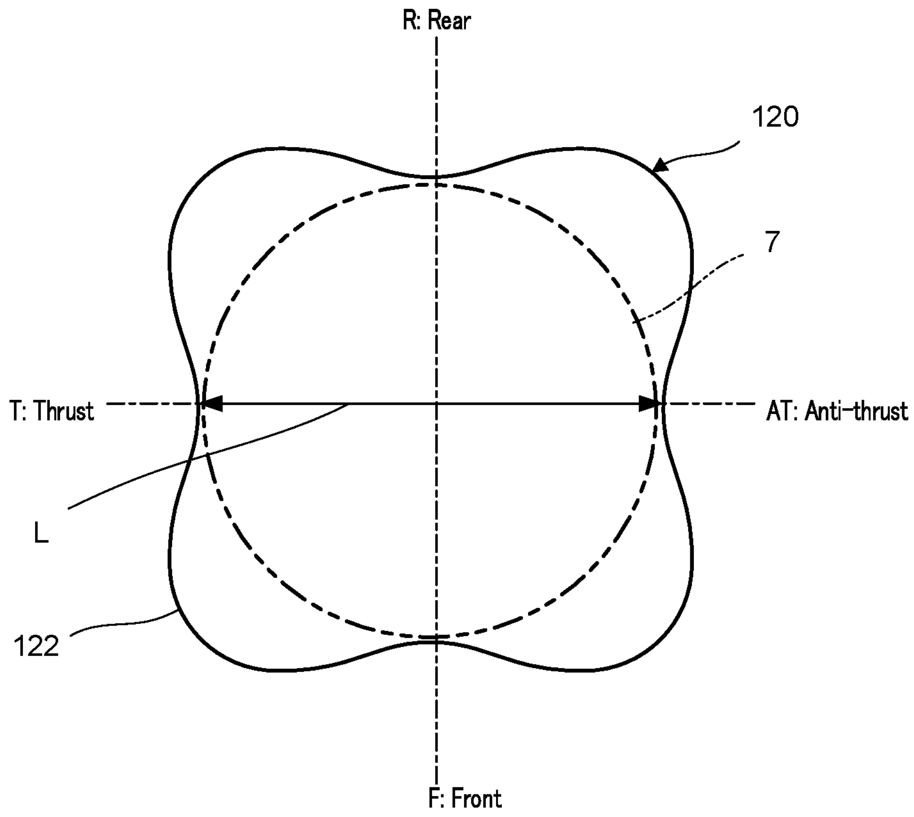
FIG. 8 is a plane view of a shape of an inner circumference portion of a central portion with emphasis thereon.

Multi-bulging inner circumference portion 120 is, for example, an inner circumference portion (liner) having a four-bulging shape, as illustrated in FIGS. 2 to 4, 7, and 8. In multi-bulging inner circumference portion 120, a diameter extending in the axis direction of piston pin 26 (diameter extending in rear R-front F direction) perpendicular to the thrust-anti thrust direction is minimal diameter L, as with the diameter in the thrust-anti thrust direction. As illustrated in FIGS. 7 and 8, multi-bulging inner circumference portion 120 has a shape with bulging portion 122 that bulges diametrically outward in a cross shape in a plan view, in virtual inner circumference portion 7 which has a perfect circular shape and through which piston 20 can pass.

Further, at least in cylinder 100, a shape of central portion 110*b* only needs to be configured with a multi-bulging inner circumferential surface shape in which a diameter in the thrust (T)-anti thrust (AT) direction is minimal diameter L. For example, in the inner circumferential surface over the axis direction of cylinder 100, only the part of central portion 110*b* may be configured with multi-bulging inner circumference portion 120 (see dashed line part in lower portion 110*c*) in the shaft direction.

Incidentally, boundary 114 between central portion 110*b* and lower portion 110*c* is a position at which piston 20 is in the bottom dead center (position where lower edge portion of piston 20, in particular, piston head is) (see FIG. 4D), and is a lower edge position of a movable range of piston 20.

FIGS. 6 and 7 both illustrate a state where piston 20 reciprocatingly sliding in cylinder 100 generates the maximal side thrust. As illustrated in FIGS. 6 and 7, in engine 1 (see FIG. 1), since upper portion 110*a* of cylinder 100 is a perfect circular as with piston 20 (piston head), sliding occurs in contact on the thrust side, thereby securing a gas sealing property and preventing seizure while an oil film is formed.

In addition, since central portion 110*b* of cylinder 100 is multi-bulging inner circumference portion 120 (central portion 110*b*) in which the diameter in the thrust-anti thrust direction is minimal diameter L, a contacting part with piston 20 becomes smaller than that of a case where the inner circumferential surface of central portion 110*b* is made perfect circular. Moreover, an inner circumferential length is shorter than that of the case where the entire portion in a circumferential direction of the inner circumferential surface is formed as an oval in order to reduce a contact area.

Figure 9:
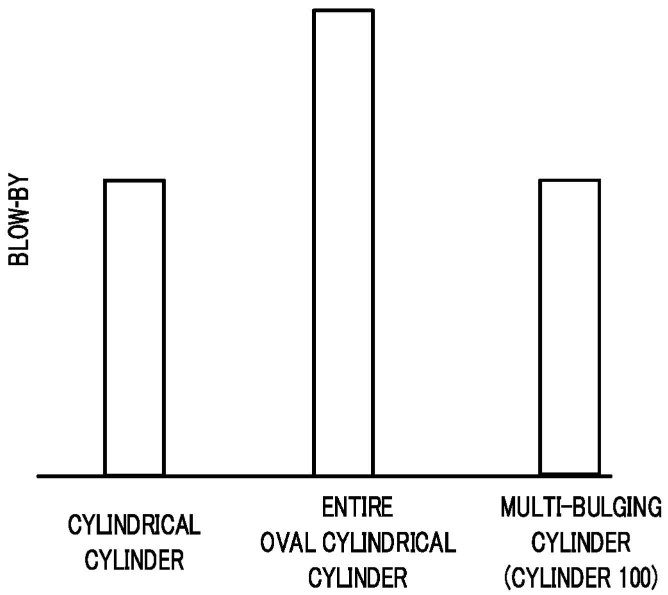
FIG. 9 is a diagram provided for comparison of blow-by between a configuration of the internal combustion engine of the present embodiment and a configuration in which a cylinder central portion is formed in a cylindrical shape.

Here, a description will be given of blow-by of engine 1 of the present embodiment. FIG. 9 is a graph comparing, as a comparative example of cylinder 100 in engine 1, blow-by between a configuration of a central portion of a cylinder relative to a piston with an inner circumferential surface being perfect circular and a configuration of a cylinder central portion with an inner circumferential surface being oval.

Multi-bulging inner circumference portion 120 of the present embodiment has the diameter in the thrust (T)-anti thrust (AT) direction, which makes the inner circumference equal to minimal diameter L, thus enabling a circumference small compared to a case where a shape of a diameter of the entire circumference is made larger than a perfect circle, such as a case where the shape thereof is an oval. When the circumference of the cylinder is made excessively larger than an outer diameter of the piston, a piston ring attached to the piston head follows due to sliding, thus expanding a joint gap. This expansion of the joint gap results in an increase in blow-by. However, in the present embodiment, the circumference length is made shorter than a circumference length of the case where the entire circumference of a cylinder inner circumference is formed as an oval, thereby suppressing the expansion of a joint gap of a piston ring to be attached to a piston. According to the present embodiment, as is apparent from FIG. 9, a sliding region of the piston skirt can be reduced from central portion 110*b* of cylinder 100 (liner) to lower portion 110*c* while retaining an oil film on an upper portion of the cylinder and suppressing blow-by, thereby achieving abrasion reduction.

In addition, unlike a conventional method, there is no need to excessively increase an oval amount of the skirt portion so as to reduce a region of contact between the cylinder and the piston for the purpose of reducing abrasion of the piston skirt portion. That is, a surface pressure of the skirt portion is not increased at the upper portion of the cylinder, and no abrasion deterioration or seizure occurs by the oil film breakage.

In the present embodiment, central portion 110*b* of cylinder 100 of cylinder block 11 is made multi-bulging inner circumference portion 120, and this multi-bulging inner circumference portion 120 has a four-bulging shape, but a three (or more)-bulging shape is possible as long as a diameter in the thrust-anti thrust direction is minimal diameter L. For example, as illustrated in FIGS. 10 and 11, an inner circumference portion may have a sixth-bulging shape.

Figure 10:
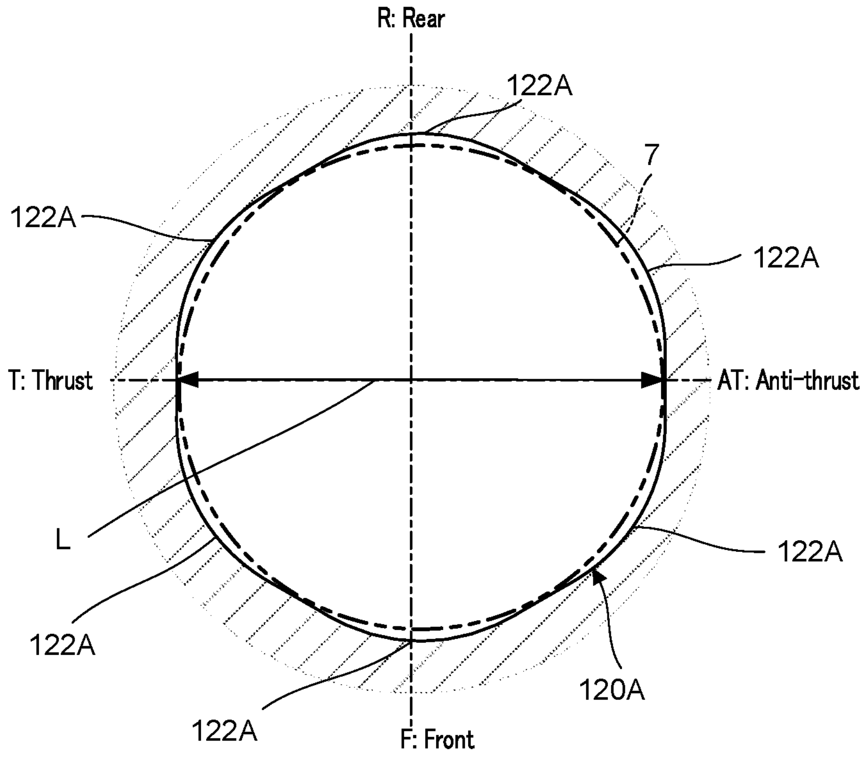
FIG. 10 illustrates a variation of the inner circumference portion of the cylinder central portion.
Figure 11:
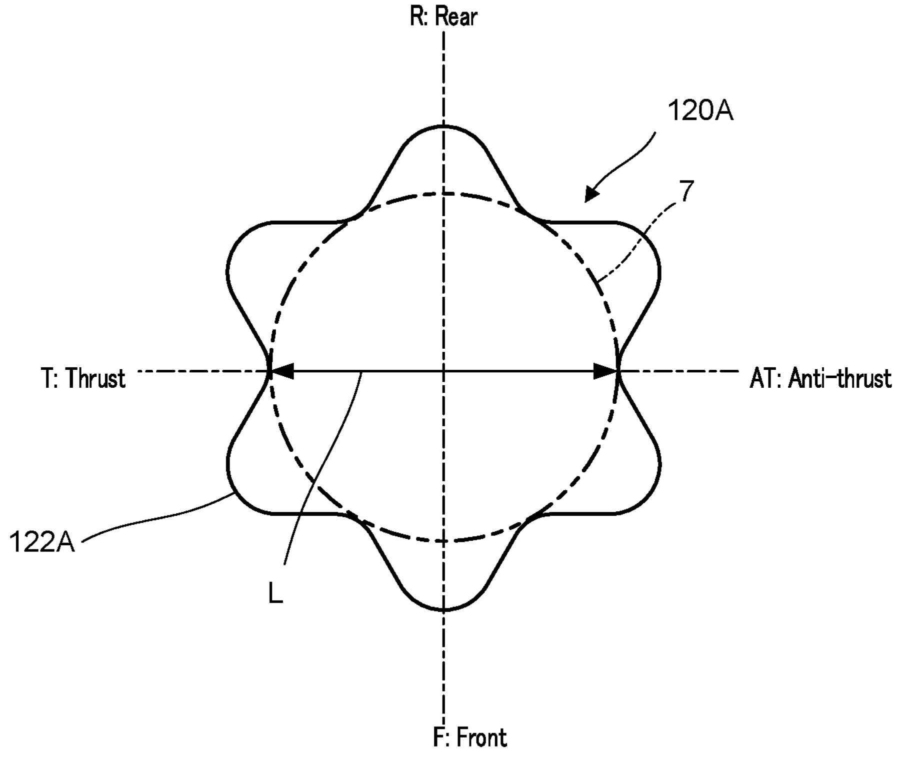
FIG. 11 is a plane view of a shape of the inner circumference portion of FIG. 10 with emphasis thereon.

FIG. 10 illustrates a variation of the inner circumference portion of the central portion of the cylinder, and FIG. 11 is a plane view of a shape of the inner circumference portion of FIG. 10 with emphasis thereon.

Multi-bulging inner circumference portion 120A illustrated in each of FIGS. 10 and 11 has minimal diameter L in the thrust-anti thrust direction, and has a shape bulging outward in multiple directions at multiple positions relative to outer diameter 7 of a virtual cylinder. Multi-bulging inner circumference portion 120A has six bulging portions 122A and is formed such that, from a lower edge of upper portion 110*a* downward, a diameter in the thrust-anti thrust direction is constant at minimal diameter L while major diameter parts, which are bulging portions 122A, gradually increase from an upper portion. Thus, a similar operational effect as in inner circumference portion 120 described above can be obtained.

Multi-bulging inner circumference portion 120 may has a shape that is a combination of different multi-bulging shapes as long as a diameter in the thrust-anti thrust direction is the minimal diameter. Examples of the combined shapes include a configuration in which different multi-bulging shapes are adjacently formed in the axis direction of cylinder 100.

The embodiment of the present invention has been described, thus far. It should be noted that the above description is illustrative of a preferred embodiment of the present invention, and the scope of the present invention is not limited thereto. That is, the configuration of the internal combustion engine and the shape of each portion are merely examples, and it is obvious that various modifications and additions to these examples are possible within the scope of the present invention.

INDUSTRIAL APPLICABILITY

An internal combustion engine and a cylinder block according to the present invention are each useful for realizing an internal combustion engine that has an effect of reducing abrasion with a piston while retaining an oil film on an upper portion of a cylinder, and that reduces abrasion sliding with the piston.

The invention claimed is:

1. An internal combustion engine, comprising:

a cylinder block that includes a cylinder; and a piston that is stored in the cylinder in a manner capable of reciprocating along an axis line of the cylinder, wherein the cylinder includes a multi-bulging inner circumference portion in which a diameter in a thrust-anti thrust direction is a minimal diameter, the multi-bulging inner circumference portion including multiple bulging portions that bulge outward relative to an outer diameter of a virtual cylinder having a perfect circular shape through which the piston passes;

the multi-bulging inner circumference portion is positioned below a position at which a maximal side thrust is received in the cylinder during combustion and expansion strokes; and the bulging portions are parts having major diameters longer than the minimal diameter and gradually increase downward from the position.

2. The internal combustion engine according to claim 1, wherein the cylinder includes a perfect-circular inner circumference portion on a side of a top dead center of the piston relative to the multi-bulging inner circumference portion.

3. The internal combustion engine according to claim 1, wherein the multi-bulging inner circumference portion is positioned below a lower edge position of a skirt portion of the piston that is in a top dead center.

4. A cylinder block, comprising a cylinder that stores therein a piston such that the piston is capable of reciprocating therein, wherein the cylinder includes a multi-bulging inner circumference portion in which a diameter in a thrust-anti thrust direction is a minimal diameter, the multi-bulging inner circumference portion including multiple bulging portions that bulge outward relative to an outer diameter of a virtual cylinder having a perfect circular shape through which the piston passes;

the multi-bulging inner circumference portion is positioned below a position at which a maximal side thrust is received in the cylinder during combustion and expansion strokes; and the bulging portions are parts having major diameters longer than the minimal diameter and gradually increase downward from the position.

* * * * *